(12) United States Patent
Snijders et al.

(10) Patent No.: US 8,098,229 B2
(45) Date of Patent: Jan. 17, 2012

(54) CONTROL DEVICE FOR COMPUTER

(75) Inventors: Christiaan Johannes Snijders, Wassenaar (NL); Robbert Smit, Taipei (TW); Paulus Cornelius Helder, Breda (NL)

(73) Assignee: Hippus N.V., Breda (NL)

( * ) Notice: Subject to any disclaimer, the term of this patent is extended or adjusted under 35 U.S.C. 154(b) by 997 days.

(21) Appl. No.: 11/993,360

(22) PCT Filed: Jun. 27, 2006

(86) PCT No.: PCT/NL2006/050150
§ 371 (c)(1),
(2), (4) Date: Feb. 1, 2008

(87) PCT Pub. No.: WO2007/001181
PCT Pub. Date: Jan. 4, 2007

(65) Prior Publication Data
US 2010/0141581 A1    Jun. 10, 2010

(30) Foreign Application Priority Data
Jun. 27, 2005   (NL) .................................... 1029350

(51) Int. Cl.
*G09G 5/00*    (2006.01)
(52) U.S. Cl. ......... 345/163; D14/402; 345/156; 345/166
(58) Field of Classification Search .................. 345/157, 345/160, 165, 168, 179
See application file for complete search history.

(56) References Cited

U.S. PATENT DOCUMENTS

| | | | |
|---|---|---|---|
| 5,576,733 A * | 11/1996 | Lo .................................. | 345/163 |
| 7,675,505 B1 * | 3/2010 | Gehrking ....................... | 345/163 |
| 2001/0052894 A1 | 12/2001 | Segalle | |
| 2002/0105500 A1 | 8/2002 | Edwards et al. | |

FOREIGN PATENT DOCUMENTS

| WO | WO00/51069 A | 8/2000 |
|---|---|---|
| WO | WO2004063844 A | 7/2004 |

OTHER PUBLICATIONS

Jan. 30, 2007 European Search Report in corresponding PCT/NL2006/050150.

* cited by examiner

*Primary Examiner* — Lun-Yi Lao
*Assistant Examiner* — Shaheda Abdin
(74) *Attorney, Agent, or Firm* — Young & Thompson

(57) ABSTRACT

Control device for a computer mouse. In order to enhance comfort as much as possible and to avoid or even cure RSI phenomena, a control device is proposed with a curved finger-supporting element and thumb-supporting element with varying curvatures. Optimum support for the hand and fingers (thumb) is obtained if there is a certain correlation between the length over which the hand, including the fingers, is supported and the width available for supporting the fingers. This value is preferably in the range 0.3-0.6 and more specifically is 0.45. Furthermore, the curvature and height of the finger-supporting element and thumb-supporting element must be implemented such that they are a function of the length of the control device. According to a particular embodiment the finger-supporting element is implemented such that, when viewed transversely, this descends from the highest point in a circle.

11 Claims, 3 Drawing Sheets

CONTROL DEVICE FOR COMPUTER

The present invention relates to a control device for a computer comprising a base for placing on a table or such like, a support for the human hand, provided with at least one switch, where said support comprises a thumb-supporting element and a curved finger-supporting element, said elements being located at different levels in the operating position, with said thumb-supporting element and said finger-supporting element merging into a common hand-supporting element, said hand-supporting element comprising a hand-supporting part extending at an angle from the base and wherein (X) is the distance from the start of the hand-supporting part to the end of the finger-supporting element and (Y) is the width of the finger-supporting element at the highest point of the curvature thereof.

Such a device is disclosed in PCT/NL2004/00012.

Such a control device has been shown to prevent all manner of undesirable symptoms associated with long-term use thereof such as RSI (repetitive strain injury) or, if such a phenomenon has already occurred, even to be capable of mitigating or curing it. In general, such phenomena are also termed WRMD (work-related musculoskeletal disorders).

The device described in patent application 2004/00012 performs reasonably well. However, this control device has been shown not to meet market demands. This is caused by the great variation in hand sizes of different people. It is therefore necessary to provide a range of different control devices adapted to the most commonly occurring sizes of the human hand.

US 2002/0105500 describes a control device in which the hand is forced into a tilted position. The fingers lie more or less flat, as a result making operation of a switch difficult.

US 2001/0052894 discloses a control device that only provides support for the fingers. These are retained in recesses designed for this purpose.

WO 00/51069 describes a control device in which the fingers are supported such that they are bent at a large angle (more than 90°).

On the other hand, it has been shown that it is not possible, starting with a well-functioning control device, to make this suitable for larger or smaller hands simply by making it larger or smaller, respectively, in three dimensions.

It is the aim of the present invention to propose a design for a control device, which provides a simple means of creating an optimum shape as a function of the size of the user's hand, as a result of which the above-described undesirable phenomena can be avoided as much as possible.

This aim is achieved in an above-described control device in that Y/X lies between 0.3 and 0.6.

More specifically, Y/X lies between 0.4 and 0.5, while in one particular preferred embodiment Y/X is approximately 0.46. Surprisingly, it has been found that if the control device is designed within this range, the width of the hand is always optimally adapted to the length of the hand in the control device.

According to a particular embodiment of the invention there is also a correlation between the length of the control device and the height $Z_1$ of the curvature of the finger-supporting element. These fall within Table I below according to a particular embodiment of the invention. It will be understood that the intermediate values which can be obtained by simple interpolation can also fall within the scope of protection of this particular embodiment.

TABLE I

| X | $Z_1$ |
|---|---|
| 161 | 43 |
| 171 | 46 |
| 182 | 49 |
| 192 | 51 |
| 201 | 54 |

In a particular embodiment of the invention the thumb-supporting element is also curved. The distance $Z_2$ from the highest point of such a curvature to the base also turns out preferably to be a function of the length of the total control device. More specifically, this height is as follows:

TABLE II

| X | $Z_2$ |
|---|---|
| 161 | 27 |
| 171 | 28 |
| 182 | 30 |
| 191 | 31 |
| 201 | 33 | wherein intermediate values are also included as indicated above.

The distance G from the highest point of the curvature of either the finger-supporting element or the thumb-supporting element to the free end of either the fingertips or the thumb must be chosen, depending on the length of the control device, i.e. the length of the user's hand. The following correlation preferably applies for the finger-supporting element:

TABLE III

| X | G |
|---|---|
| 161 | 43 |
| 171 | 46 |
| 182 | 49 |
| 191 | 52 |
| 201 | 54 |

The following preferably applies for the distance H with reference to the thumb-supporting element:

TABLE IV

| X | H |
|---|---|
| 161 | 65 |
| 171 | 69 |
| 182 | 73 |
| 191 | 77 |
| 201 | 81 |

Here, too, intermediate values can easily be determined by interpolation.

It must be understood that the total distance X is used here to mean the distance from the lowest part of the hand, i.e. the first point of transition to the wrist. It is possible, of course, to extend the device at this point, but this extended part will generally be mainly horizontal and is not relevant for the above-mentioned reasons. The length of the hand corresponds to the length of the control device, while the transverse direction is the vertical at this location. If such an extension is used to support the wrist, the length thereof in the horizontal projection is approximately half the length from the next element to the highest point of the device.

According to a further advantageous embodiment there is a correlation between the width axis along the contour of the palm of the hand (Y) and the length of the wrist- and hand-supporting element to the top of the device (P). Surprisingly, the ratio of these two values in such an embodiment turns out to be constant.

TABLE V

|  | Width axis along contour of palm of hand Y | Length of wrist-supporting element along X-axis P | Y/P ratio |
| --- | --- | --- | --- |
| 160 mm | 75 | 95 | 0.8 |
| 170 mm | 80 | 101 | 0.8 |
| 180 mm | 85 | 108 | 0.8 |
| 190 mm | 89 | 113 | 0.8 |
| 200 mm | 94 | 119 | 0.8 |

According to a further important embodiment the value $Z_1/Z_2$ is essentially constant. More specifically, this figure is approximately 1.6.

According to a further advantageous embodiment of the invention the finger-supporting element is implemented such that this forms a circular element when viewed transversely from the curvature. In a further embodiment of the current invention the radius R of the circular element meets the following conditions:

TABLE VI

| X | R | J |
| --- | --- | --- |
| 161 | 109 | 80 |
| 171 | 116 | 85 |
| 182 | 123 | 90 |
| 191 | 130 | 95 |
| 201 | 137 | 100 |

According to a particular embodiment of the invention the finger-supporting element, viewed longitudinally, runs from the highest point of the control device forward in an arc in the direction of the fingertips. More specifically, the mid-point of this arc lies on the underside of the control device. In a transverse direction there is also a finger support extending in an arc from the highest point of the finger-supporting element.

Apart from the $Z_1/Z_2$ ratio, $Z_1/Y$ or $Z_1/X$ or $Y/X$ are also constant according to an advantageous embodiment, with the relevant constants being approximately 0.6/0.3/0.5 respectively.

According to a further advantageous embodiment the transverse end of the finger-supporting element, i.e. the part where the little finger is located, has a raised edge.

According to a particular embodiment of the invention the finger-supporting element, with the exception of any transverse end as specified above, has a smooth finish, i.e. there is no division between adjacent fingers and there is no question of a bowl shape being produced to give the fingers a preferred position.

The invention will be explained in more detail below, with reference to an embodiment as example shown in the drawing, in which.

Figure 1:
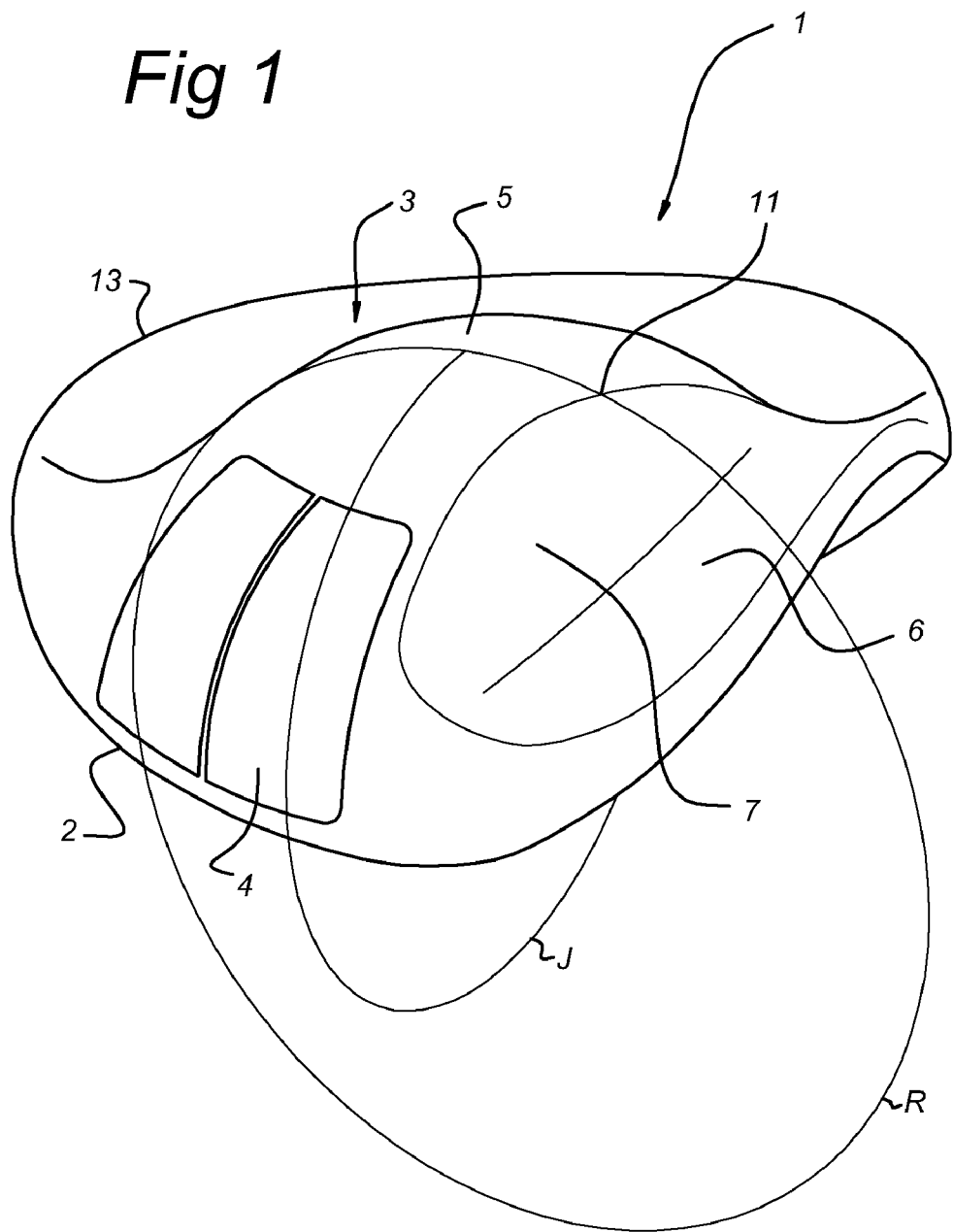
FIG. 1 shows a perspective view of a preferred embodiment of the invention.
Figure 2:
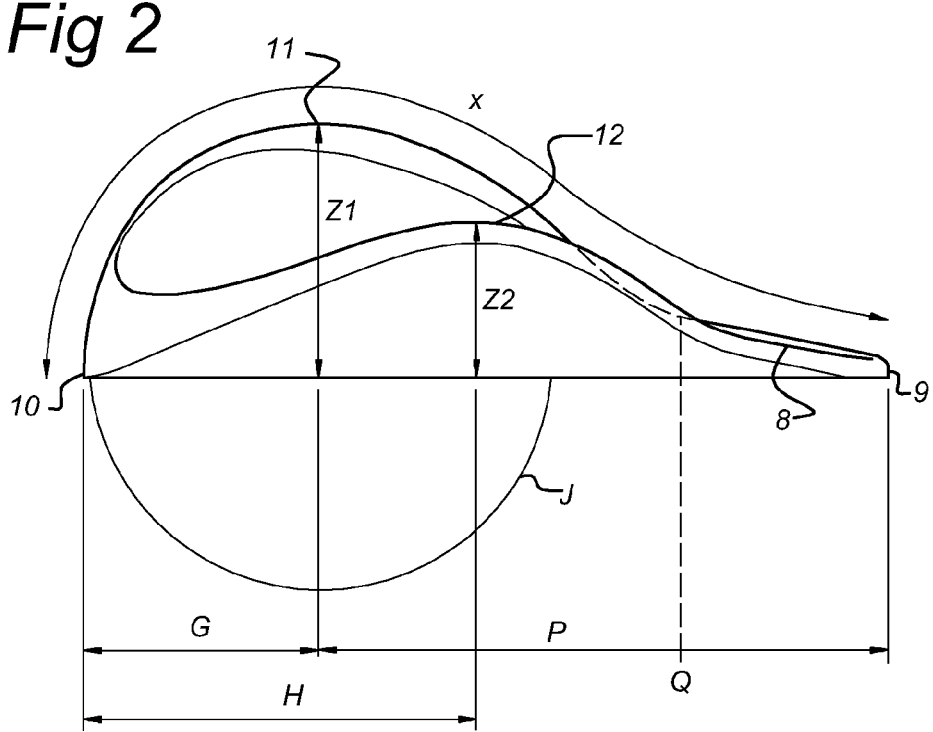
FIG. 2 shows a side view of the control device according to the invention.
Figure 3:
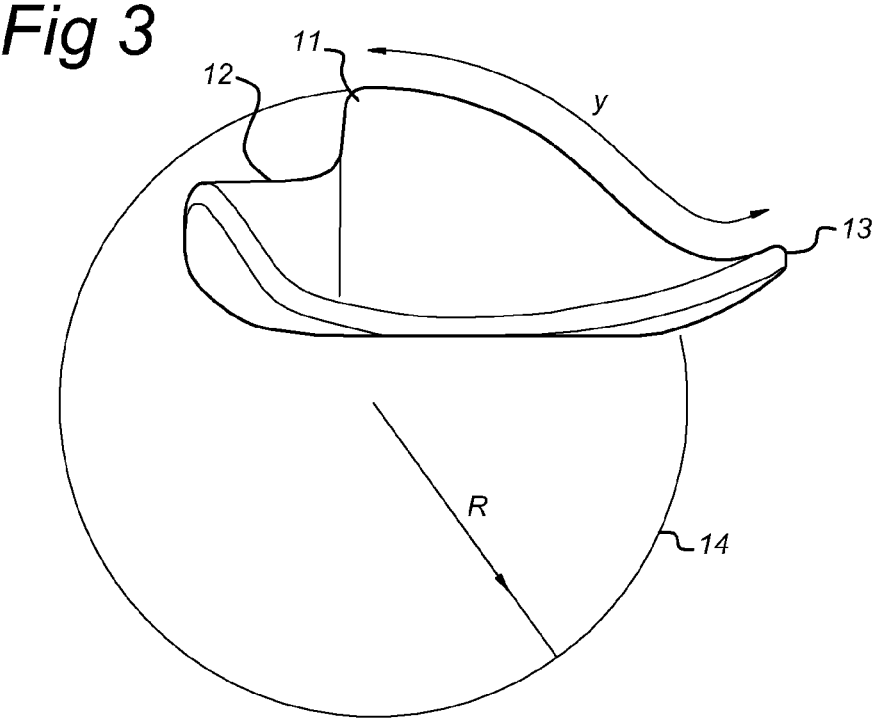
FIG. 3 shows the control device from the wrist side.
Figure 4:
FIG. 4 shows the control device from the fingertip side.

The control device according to the invention is generally referred to by 1. This consists of a base 2 for placing on a table or such like and a support configured above this for the hand. An operating switch is indicated by 4. It will be understood that this can be located at any position and can work mechanically or otherwise.

A finger-supporting element is indicated by 5, and a thumb-supporting element by 6. 7 represents a raised edge to support the thumb. The finger-supporting element 5 and thumb-supporting element 6 come together in the hand-supporting element 8. This finishes in the wrist end 9 of the device which extends to the fingertip end 10 (viewed longitudinally).

The highest part of the finger-supporting element is indicated by 11, while 12 is the highest part of the thumb-supporting element 13 designates a raised edge for retaining the little finger.

The distance from 9 to 10 is indicated by X. This is the distance over the finger-supporting element and, more specifically, over the highest point 11 thereof. Y represents the distance from the highest point 11 to the free end of the control device. $Z_1$ is the height from the base 2 to point 11, while $Z_2$ is the height from the base to point 12, the highest point of the thumb-supporting element. It is clear that this highest point lies behind the highest point 11 of the finger-supporting element. These are indicated by the distances G and H, respectively. As is apparent from the drawing, the points 10 and 11 are located on a circle J. The relevant values for J are given in Table V. P is the distance between 11 and 9 in a horizontal projection. The transition to the steeply-rising part on which the hand rests is at approximately one-third (at Q).

From the above and the claims a correlation is seen to have been found between the length X and the various above-mentioned values Y, $Z_1$, $Z_2$, G and H. Moreover, it turns out that the downward part of the finger-supporting element describes a circle of radius R which is a function of the length X. It will be understood that there is not only a correlation between X and the variables specified here but also among the variables themselves.

The above-mentioned values provide an easy means of designing a control device as a function of the size of a hand which performs optimally.

Moreover, it has been found that preferably there is a correlation between the length X and the weight of the control device. After all, the control device has to be moved under certain circumstances, and it has emerged that the lowest possible weight is not the optimum, but that certain requirements have to be specified in order to optimise the feeling experienced. In the preferred embodiment the weight as a function of the length has to meet the following values:

TABLE VII

| X | A (mass) |
| --- | --- |
| 160 | 90 |
| 170 | 130 |
| 180 | 170 |
| 190 | 210 |
| 200 | 250 |

It will be understood that such a weight can be implemented both by incorporating more material and by making it more or less hollow or incorporating different types of material.

It must be understood that the above-specified values can be used for a wide variety of control devices for computers and that the invention is not limited to the embodiment shown here. It will also be understood that sub-claims contain patentable material independently but also in combination with each other, i.e. independently of what is described in Claim 1, and explicit rights are being requested for said material.

The invention claimed is:

1. A control device for a computer, comprising:
a base for placing on a table;
a support for a human hand, provided with at least one switch where said support comprises a thumb-supporting element and a curved finger-supporting element, said elements being located at different levels in the operating position, with said thumb-supporting element and said finger-supporting element merging into a common hand-supporting element, said hand-supporting element comprising a hand-supporting part extending at an angle from the base, wherein
(X) is a distance from the start of the hand-supporting part to the end of the finger-supporting element;
(Y) is a width of the finger-supporting element at the highest point of the curve thereof;
$Z_1$ is a height of the curvature of the finger supporting element and $Z_2$ is the highest point of the curvature of a thumb supporting element, wherein Y/X lies between 0.3 and 0.6 and $Z_1$ is approximately 1.6 $Z_2$,
wherein said thumb-supporting element is curved, and a distance H from the highest point of the curvature of said thumb-supporting element to the end surface of said thumb-supporting element is a function of X according to the following

| X | H |
| --- | --- |
| 161 mm | 65 mm |
| 171 mm | 69 mm |
| 182 mm | 73 mm |
| 191 mm | 77 mm |
| 201 mm | 81 mm | including interpolated values.

2. The control device according to claim 1, in which Y/X=0.4-0.5.

3. The control device according to claim 1, in which Y/X is approximately 0.45.

4. The control device according to claim 1, in which the distance ($Z_1$) from the highest point of the curvature of said finger-supporting element to said base (2) is a function of X according to the following

| X | $Z_1$ |
| --- | --- |
| 161 mm | 43 mm |
| 171 mm | 46 mm |
| 182 mm | 49 mm |
| 191 mm | 51 mm |
| 201 mm | 54 mm | including the interpolated values.

5. The control device according to claim 1, in which said thumb-supporting element is curved and the distance ($Z_2$) from the highest point of this curvature of said thumb-supporting element to the base is a function of X according to the following

| X | $Z_2$ |
| --- | --- |
| 161 mm | 26 mm |
| 171 mm | 28 mm |
| 182 mm | 30 mm |
| 191 mm | 31 mm |
| 201 mm | 33 mm | including the interpolated values.

6. The control device according to claim 1, in which the distance (G) from the highest point of this curvature of said finger-supporting element to the end surface of said finger-supporting element is a function of X according to the following

| X | G |
| --- | --- |
| 161 mm | 43 mm |
| 171 mm | 46 mm |
| 182 mm | 49 mm |
| 191 mm | 52 mm |
| 201 mm | 54 mm | including the interpolated values.

7. The control device according to claim 1, in which, from the highest point of the curvature of the finger-supporting element, said finger-supporting element is transversely lowered according to a circle.

8. The control device according to claim 7, in which the circle has a radius R that is a function of X according to the following

| X | R |
| --- | --- |
| 161 mm | 109 mm |
| 171 mm | 116 mm |
| 182 mm | 123 mm |
| 191 mm | 130 mm |
| 201 mm | 137 mm | including the interpolated values.

9. The control device according to claim 1, in which the part of the finger-supporting element which supports the little finger has a raised edge (13).

10. The control device according to claim 1, in which said finger-supporting element is essentially smooth.

11. The control device according to claim 1, in which $Z_1/Z_2$ is approximately 1.6.

* * * * *